(12) United States Patent
Smith et al.

(10) Patent No.: US 8,818,192 B1
(45) Date of Patent: Aug. 26, 2014

(54) OPTICAL NETWORK UNIT WITH REDUNDANT REVERSE POWERING FROM CUSTOMER PREMISES EQUIPMENT WITH ALARM FAULT DISCRIMINATION INDICATIVE FOR POWER FAULT CONDITION

(75) Inventors: Brian C. Smith, Madison, AL (US); Steven M. Robinson, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 25 days.

(21) Appl. No.: 13/163,804

(22) Filed: Jun. 20, 2011

(51) Int. Cl.
*H04B 10/00* (2013.01)

(52) U.S. Cl.
USPC ............................. 398/72; 398/66; 398/171

(58) Field of Classification Search
CPC ..................... H04B 10/25751–10/278; H04J 14/0278–14/0286
USPC ...................................................... 398/66–73
See application file for complete search history.

(56) References Cited

U.S. PATENT DOCUMENTS

| | | | | |
|---|---|---|---|---|
| 5,469,282 A | | 11/1995 | Ishioka | 359/110 |
| 5,523,868 A | * | 6/1996 | Hawley | 398/38 |
| 5,664,002 A | | 9/1997 | Skinner, Sr. | 379/56.2 |
| 6,567,195 B1 | * | 5/2003 | Ford et al. | 398/58 |
| 6,626,586 B1 | | 9/2003 | Jaeger | 398/5 |
| 7,116,761 B2 | * | 10/2006 | Ashton et al. | 379/56.2 |
| 7,277,637 B2 | * | 10/2007 | Jette et al. | 398/70 |
| 7,379,542 B2 | | 5/2008 | Jackson | 379/102.04 |
| 7,596,801 B2 | | 9/2009 | Wall et al. | 725/129 |
| 7,652,390 B2 | * | 1/2010 | Vrla et al. | 307/1 |
| 7,672,591 B2 | * | 3/2010 | Soto et al. | 398/72 |
| 7,751,711 B2 | * | 7/2010 | Wynman | 398/72 |
| 7,923,855 B2 | * | 4/2011 | Biegert | 307/2 |
| 7,995,920 B2 | * | 8/2011 | Wynman | 398/72 |
| 8,212,375 B2 | * | 7/2012 | Paulsen et al. | 307/1 |
| 8,434,115 B1 | * | 4/2013 | Wynman | 725/74 |
| 8,543,008 B2 | * | 9/2013 | Soto et al. | 398/171 |
| 8,601,289 B1 | * | 12/2013 | Smith et al. | 713/300 |
| 2009/0016721 A1 | * | 1/2009 | Wurst et al. | 398/67 |
| 2010/0150556 A1 | * | 6/2010 | Soto et al. | 398/66 |
| 2010/0272433 A1 | * | 10/2010 | Shaffer et al. | 398/17 |
| 2011/0076022 A1 | * | 3/2011 | Tamai et al. | 398/66 |
| 2013/0080089 A1 | * | 3/2013 | Hughes et al. | 702/58 |

* cited by examiner

*Primary Examiner* — Agustin Bello
(74) *Attorney, Agent, or Firm* — Fish & Richardson P.C.

(57) ABSTRACT

An optical communication system includes a plurality of Customer Premises Equipment (CPE) each having a reverse power supply and configured to transmit and receive data and provide power over a wire pair connected thereto. An optical network unit is formed as a plurality of communication ports. A respective communication port is configured to provide communications data service with a respective CPE by transmitting and receiving data therewith. A power management circuit is connected to the communication ports and configured to receive power provided by each reverse power supply at a respective CPE and manage power consumption in the ONU. A processor is configured to receive alarms generated by at least one of a CPE and ONU indicative of a power fault condition and process the alarms and discriminate between different power fault conditions.

17 Claims, 8 Drawing Sheets

US 8,818,192 B1

OPTICAL NETWORK UNIT WITH REDUNDANT REVERSE POWERING FROM CUSTOMER PREMISES EQUIPMENT WITH ALARM FAULT DISCRIMINATION INDICATIVE FOR POWER FAULT CONDITION

FIELD OF THE INVENTION

The present invention relates to communications systems, and more particularly, this invention relates to powering an Optical Network Unit (ONU).

BACKGROUND OF THE INVENTION

Current fiber fed Optical Network Unit (ONU) type telecommunications systems require expensive to install and maintain power rectifiers and AC mains meter and service to power the ONU equipment. Power over Ethernet (PoE) provides single port powering over Ethernet service cables. There are yet other systems where a network element receives power and data over electrical lines from a Customer Premises Equipment (CPE). There is a desire, however, for greater management control and redundancy that is not provided by these types of systems.

This can be provided by a redundant reverse power communication system where multiple CPE devices push power up multiple service pairs to power a fiber-fed remote ONU. In such system, it is desirable to be able to discriminate the intentional power removal from a remote ONU and the removal of power at the CPE versus a failure of the remote ONU.

SUMMARY OF THE INVENTION

An optical communication system includes a plurality of Customer Premises Equipment (CPE) each having a reverse power supply and each connected to a wire pair and configured to transmit and receive data and provide power over the wire pair. An optical network unit includes a tip/ring interface formed as a plurality of communication ports. A respective communication port is connected to a select wire pair and CPE and configured to provide communications data service with the respective CPE by transmitting and receiving data therewith. A power management circuit is connected to the communication ports and configured to receive power provided by each reverse power supply at a respective CPE and manage power consumption in the ONU. A processor is configured to receive alarms generated by at least one of a CPE and ONU indicative of a power fault condition and process the alarms and discriminate between different power fault conditions.

In an example, the power management circuit is configured to provide a power status signal to the processor at the ONU indicative that power exists at each communication port. The processor is operative to receive an alarm signal from the CPE and determine if the CPE is powered down or if there has been a power fault condition between the CPE and ONU.

In another example, the ONU includes a voltage sensing circuit configured to sense voltage at the tip/ring interface. The processor is configured to receive a signal indicative of the voltage and enable a respective port when a valid reverse power bias voltage is determined to exist.

In another example, the processor at the ONU is configured to receive a dying gasp interrupt from a CPE indicative that power is failing on a reverse power supply at a CPE. The CPE in an example includes a circuit configured to determine when power is failing on the CPE. A processor is configured to receive and process data regarding when power is failing to generate the dying gasp interrupt that is transmitted to the ONU. A power management circuit is configured to receive the signal indicative that the processor at the ONU receive the dying gasp interrupt and discriminate CPE power fault conditions from a removal of power initiated by a customer. The ONU also includes an Ethernet switch connected to the plurality of ports. The processor is configured to switch power consumption from unused and out-of-service ports. The processor at the ONU is also configured to distinguish among external CPE power supply faults, CPE and ONU facility line faults and ONU power input protection faults. In one example, the external CPE power supply faults comprise an AC power input failure at the CPE or low battery voltage. The facility line faults in another example include a physical pair shorted and overcurrent, a physical pair open an undercurrent, and a physical pair leakage current to ground. The ONU power input detection faults include an alarm indicative whether a valid power and voltage is available at the input port.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
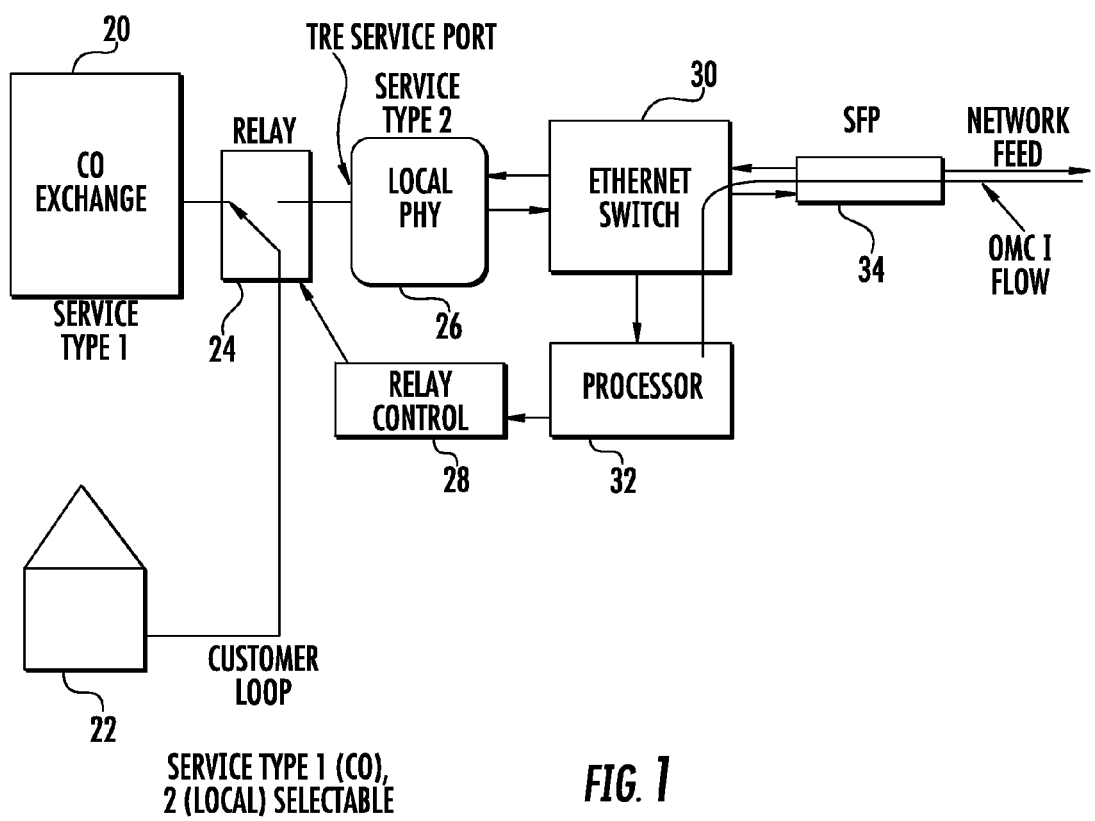
FIG. 1 is a block diagram of a communications system as an example that can incorporate a redundant reverse power system and alarm fault discrimination for power fault conditions in accordance with a non-limiting example.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

Reverse powering systems are used to power remote standalone devices over network interfaces without requiring a dedicated power source on site. As explained below with reference to FIGS. 1-8, the power is driven on the same wires as the communications channel between the devices. These reverse power systems save service providers money by obviating the need to have an AC power drop/power meter installed at the reverse powered device location.

In the redundant reverse powered communication system described relative to FIGS. 1-8, multiple CPE devices push power up multiple service pairs to power a fiber fed remote ONU. The remote ONU device can be fully powered with less power input than is available on the remote ONU. In a non-limiting example, the remote ONU provides service to one CPE endpoint when the CPE endpoint provides reverse power to the remote ONU. At the customer premises, there is nothing to prevent the end customer from removing power to the CPE and thereby remove power to the remotely powered ONU. The system and method as described is able to discriminate between the intentional removal of power from an endpoint as the cause for loss of service at a remote powered unit from a failure of the CPE itself. It is also able to discriminate the intentional power removal from the remote ONU via the removal of power at the CPE, versus a failure of the remote ONU.

The system is directed to a method of discriminating CPE device faults from CPE power removal. A method of sending an alarm or notification of these events to a remote alarm service is also provided. The system defines an alarm methodology to aid the service provider to discriminate a particular power arrangement when using a reverse powered fiber fed ONU. The service provider is able to discriminate between a real fault problem and when persons unplug their CPU or modem. The system discriminates between an intentional removal of power from an endpoint as the cause for the loss of service at the remote ONU and the failure of the CPE. The system also discriminates an intentional power removal from the remote ONU such as when power is removed at the CPE versus the failure of the remote ONU itself. This is advantageous because the system is line powered and it is desirable to know if there is a fault. This can be accomplished through generating alarm messages on the CPU if it gets unplugged or if the power fails.

Because the ONU has multiple input powering ports, power faults on one port can be isolated and communicated in many cases even without power on the pair so long as it is not enough to stop the data link from operating. With a multi-port CPE, all powering type alarms can be communicated as long as one port is good.

Figure 2:
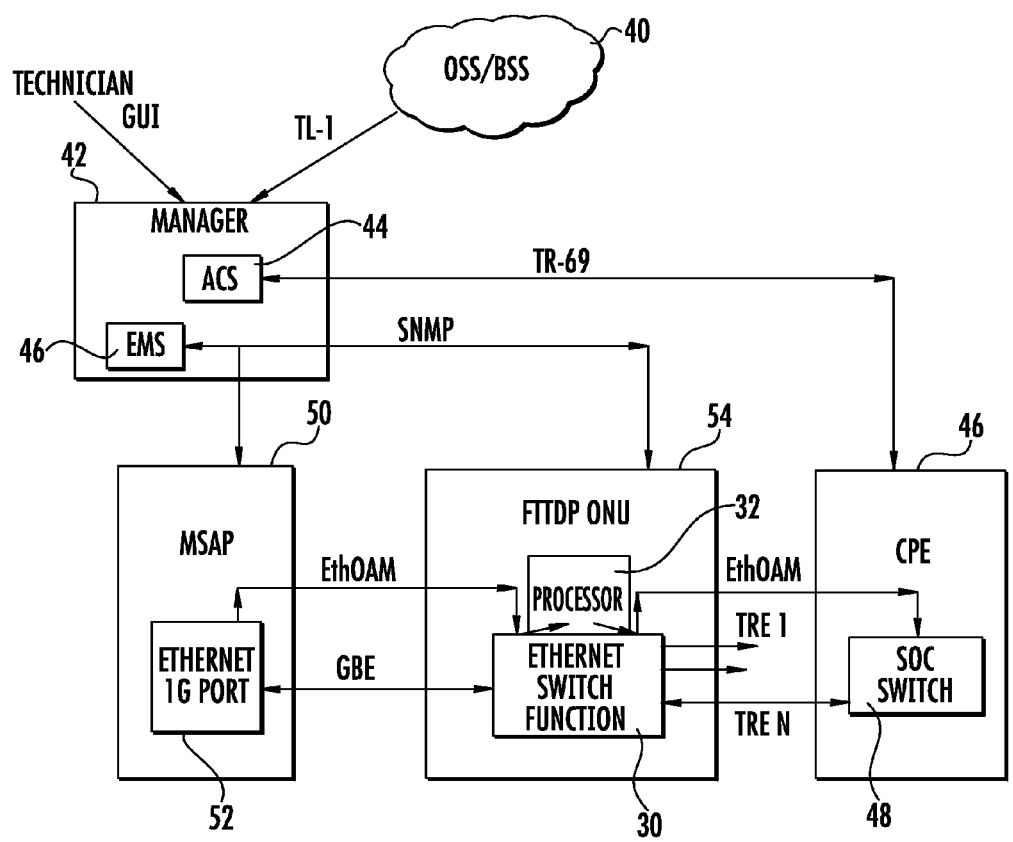
FIG. 2 is another block diagram example of a communications system similar to FIG. 1, but showing other details of a system that can be used and incorporate the redundant reverse power system and alarm fault discrimination for power fault conditions in accordance with a non-limiting example.

FIGS. 1 and 2 illustrate basic functional components of a communications system that can incorporate the reverse power system and alarm fault discrimination indicative for power fault conditions as will be described relative to FIGS. 3-8. FIGS. 1 and 2 are described as an example system that can be used and modified in accordance with a non-limiting example. Although the description relative to FIGS. 1 and 2 are described relative to a remotely managed switching element that resides in the ONU, it should be understood that the reverse powered system is used.

In accordance with a non-limiting example, it is possible to use management messages such as SNMP (Simple Network Management Protocol), OMCI (Open Managed Client Instrumentation), or CLI (Call Level Interface) management messages sent from a central office management system to configure a remotely managed switching element in the ONU. These types of messages can also be used in the reverse powered ONU described relative to FIGS. 3-8.

This remotely managed switching element is created in the FTTDP (fiber-to-the-distribution point) ONU and remotely configured by SNMP management messages or OMCI, CLI or similar command messages. This example ONU shows a latching type switching relay that maintains its state without power being applied. Any relay control circuit is under processor control. A switch, for example, an Ethernet switch, routes an SNMP set or CLI or OMCI command message as a relay message to a local processor on the FTTDP ONU over an Ethernet operations and management layer protocol (ETHOAM) message channel, using in one example a VLAN tag identifier. This system includes separate tip/ring port connections that connect to the latching type switching relay and connect the customer loop to a central office (CO) exchange port on a local Extended Reach Ethernet Service data service port. Central office services that could be provided can be any two-wire (or four-wire) type service served from the central office (CO) exchange. These services could include POTS, ADSL, VDSL, ADSL2, VDSL2, SHDSL, ISDN, HDSL4, and similar services. There could also be services from the local ONU device port, e.g., XDSL, VDSL2, ADSL2, POTS, extended reach Ethernet service, and similar services.

In one example, a message is sent via the SNMP database via the ETHOAM flow and selects the state of the relay on each port and is terminated and acted upon by a local processor. Service can be selected to a central office (CO) source service, a local TRE port service as a local source service, or disabled by connecting to the local TRE port source and taking the port out of service. In one example, it is possible to use a flash memory device on an ONU board that saves a provisioned relay state during a power failure. This system controls dynamically the physical service port connectivity to a customer premise via a management interface. The system also maintains service port connection states during a power outage and saves latching relay switch states via flash memory storage of SNMP MIB data. It is possible that there is a remotely powered fiber optic device that performs servicing and operates as a smart relay and manages the service. As noted before, the ONU is remotely powered in this example and includes alarm fault discrimination indicative for power fault conditions as will be explained in greater detail relative to FIGS. 3-8.

FIG. 1 shows an overall block diagram view of the communications system and showing the central office (CO) exchange 20 as a service type 1 and connected to a customer loop 22 and selectable between the central office exchange and the customer loop using the relay 24. A service type 2 local physical device 26 is connected to the relay by an Extended Reach Ethernet Service port (a TRE service port) in a non-limiting example. A relay control 28 connects to the relay and the local physical device 26 connects to the switch 30, which in this example, is an Ethernet switch. A processor 32 connects to the relay control 28 and Ethernet switch 30 and interoperates with the relay control and the Ethernet switch, which in turn connects to a selectable fiber optic (SFP) module 34 and a network feed 36 for an optical media converter (OMC) data flow.

FIG. 2 shows a block diagram of a basic management model and network architecture. In this example, the illustrated Ethernet switch 30 and processor 32 are the same reference numerals in FIG. 1, otherwise the reference numerals for components shown in FIG. 2 begin in the 40's.

An Operation Support System/Business Support System (OSS/BSS) 40 connects to a central office manager 42 that includes an auto configuration server (ACS) 44 and element management system (EMS) 46 that manages network elements using SNMP. These components could be supplied from ADTRAN, INC. The ACS 44 communicates to at least one customer premises equipment 46 that includes a system-on-chip (SOC) switch 48. Only one CPE is illustrated, but the ONU typically connects to a plurality of CPE's. The EMS 46 communicates with a multi-service access and aggregation platform (MSAP) 50 that could be a Total Access 5000 device from ADTRAN, INC. and includes an Ethernet one gigabit (1G) port 52 that communicates over ETHOAM with the FTTDP ONU 54, which includes the Ethernet switch 30 and processor 32. The Ethernet IG port 52 communicates using gigabit Ethernet (GB E) to the Ethernet switch. The OSS/BSS 40 communicates via a Transaction Language I (TL-1) protocol with the ACS 44 in one example. A technician communicates with the central office manager 42 using a graphical user interface (GUI). The ACS communicates to a CPE in this example using TR-069 as an application layer protocol such as CPE WAN Management Protocol (CWMP).

Figure 3:
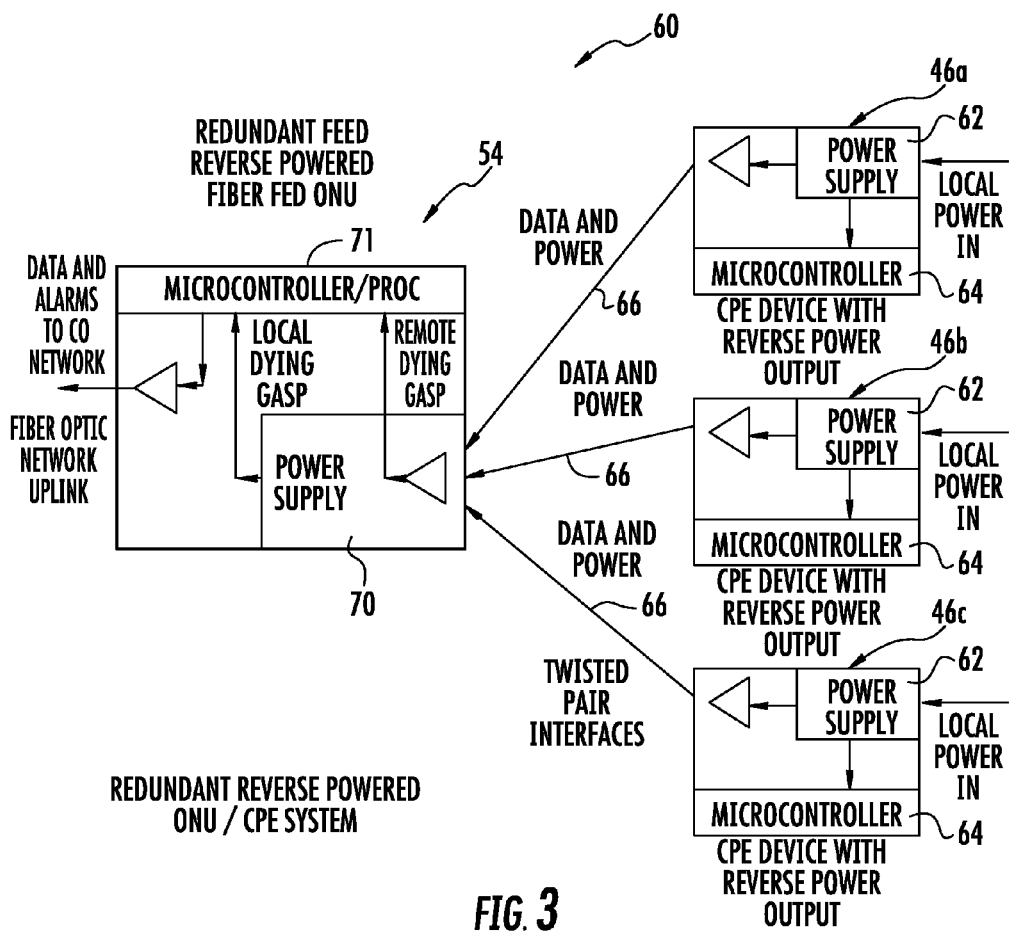
FIG. 3 is a block diagram showing a reverse powered ONU connected to three Customer Premises Equipment (CPE) end point devices that use reverse power supplies in accordance with a non-limiting example.

FIG. 3 illustrates a redundant reverse powered ONU/CPE system illustrated generally at 60, which includes a plurality of Customer Premises Equipment (CPE) shown as three CPE's 46a, 46b, 46c as end point devices each having a reverse power supply circuit 62 that interoperates with its local microcontroller to provide each CPE device with reverse power output. Redundancy is provided as explained below. A data communication channel is shown between each CPE and an ONU over the metallic twisted wire pair 66 as illustrated and the DC voltage is applied to the metallic twisted wire pair from the CPE device to the ONU and used by the remote ONU device to power itself. This provides powering from redundant sources as CPE's and provides telecommunication data services to the end customer at the CPE device. Data is communicated back and forth between each CPE and the ONU. The ONU 54 includes a power supply shown generally by a block diagram at 70, and a power management circuit as explained below that interoperates with a plurality of communication ports and microcontroller 71 or processor. A respective communication port is connected to a selected wire pair and its associated CPE through which data is transmitted and received and power received therefrom. The power management circuit is connected to each of the communication ports and configured to receive power and provide power sharing and manage power consumption and power supply redundancy from the plurality of CPE units through the communication ports. The power supply can initiate a local dying gasp to the microcontroller/processor and a remote dying gasp can be received from a CPE device and provided to the microcontroller/processor.

Figure 4:
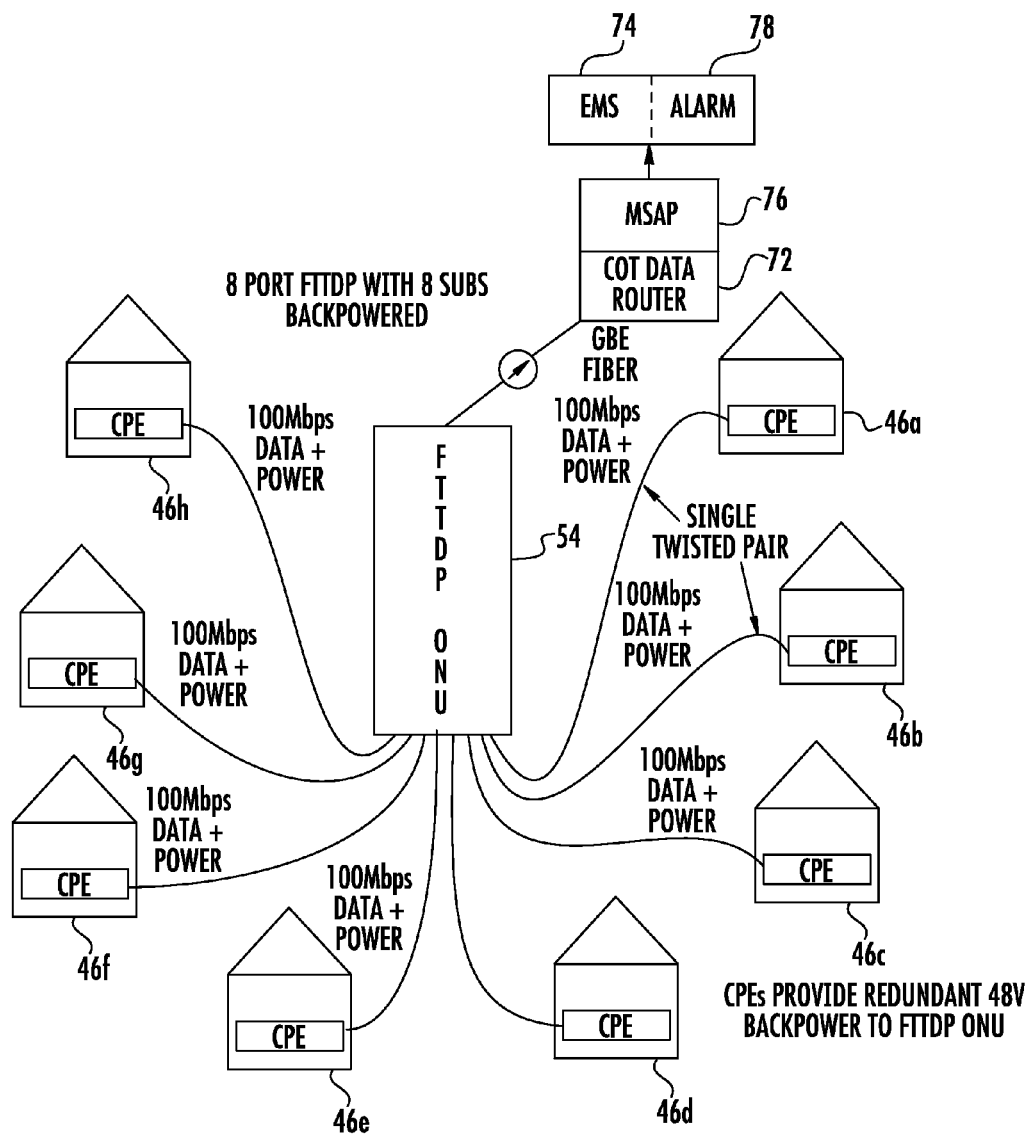
FIG. 4 is a block diagram showing a Fiber-to-the-Distribution Point (FTTDP) ONU and eight connected CPE's in a typical deployment in accordance with a non-limiting example.

FIG. 4 is a system block diagram showing an FTTDP ONU 54 such as shown in FIG. 3 and eight connected CPE units 46a-h in a typical deployment. Each CPE is connected to a port on the ONU and provides at least 100 to at least 1,000 Mbits/s bidirectional data service over a single twisted wire pair. Each CPE provides 48 volt power on a pair to reverse power the ONU in a redundant fault tolerant topology. The ONU can be powered from one CPE and provide service to that CPE connection. The ONU is connected to a Central Office Terminal (COT) data router 72 and EMS 74 that can be part of a Multi-Service Access Platform (MSAP) 76 and alarm system 78 that is upstream over a one GBE fiber.

Figure 5:
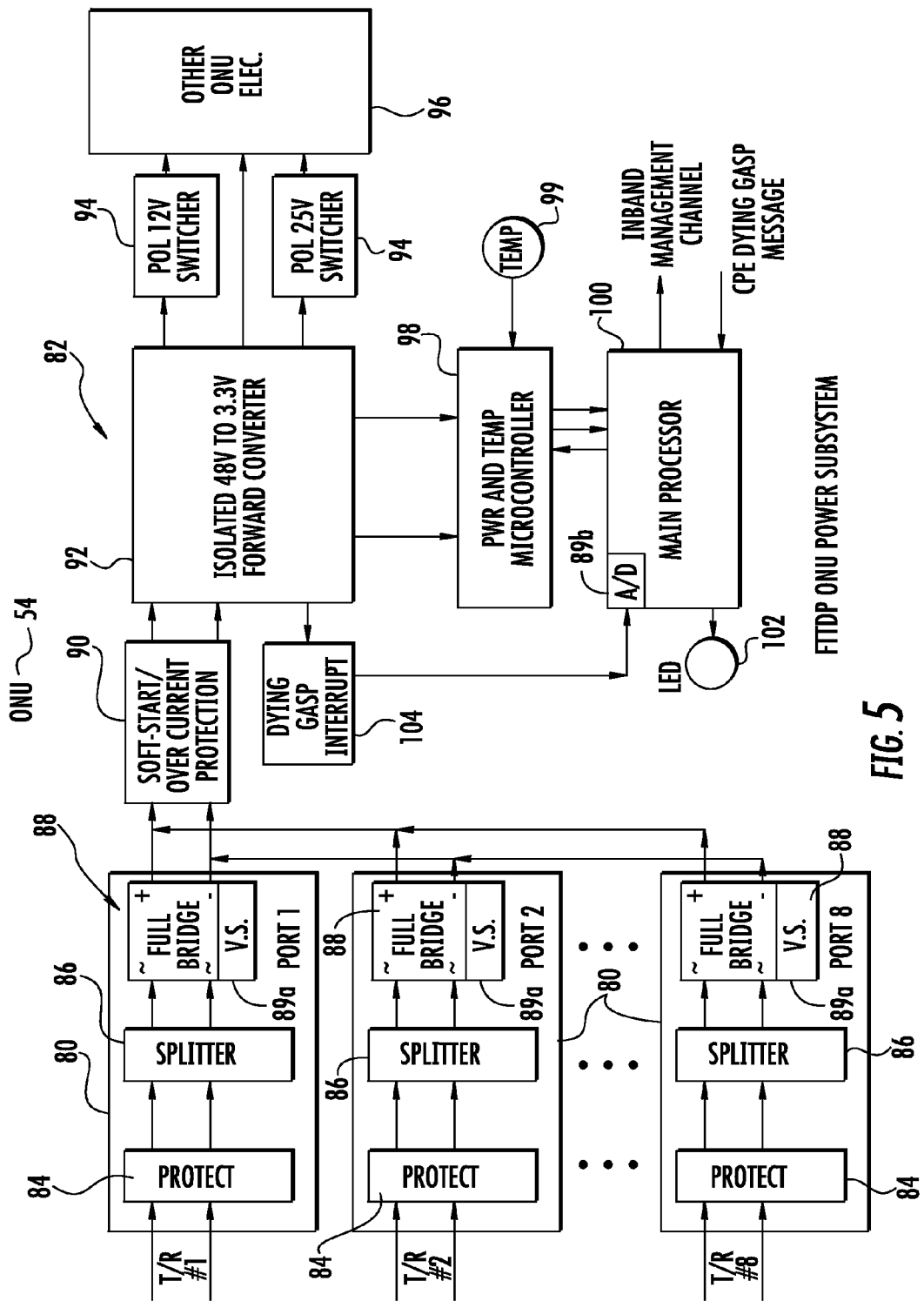
FIG. 5 is a block diagram showing an example of an ONU configured to receive redundant power and provide alarm fault discrimination for power fault conditions.

FIG. 5 illustrates a block diagram of an ONU 54 that is reverse powered in accordance with a non-limiting example. As illustrated, the ONU 54 includes a plurality of communication ports 80 illustrated as eight ports shown as port 1 through port 8 and each connected to a selected wire pair shown as T/R #1 through T/R #2 and an associated CPE (not shown in FIG. 5) through which the data is transmitted and received and power received therefrom. A power management circuit 82 is connected to each of the communication ports 80 and configured to receive power and provide power sharing and manage power consumption and power supply redundancy from the plurality of CPE through the communication ports. Each port 80 includes a protection circuit 84 as a secondary protection circuit for a port tip/ring interface. Each port also includes a splitter circuit 86, for example, a splitter inductor which isolates the on-board power supply from any high-speed line data interface. Each port at the ONU also includes a front-end power circuit 88 connected to the power management circuit 82 and configured to isolate individual port failures, port pair shorts and allow normal operating when other ports are functional. In an example, the front-end power circuit 88 at each port includes a full bridge circuit that provides diode steering and is configured to allow tip/ring reversals and provide diode "OR" function to support multiple interface port redundancy.

Each communications port at the ONU includes a voltage sensing circuit 89a that permits a power check to be performed on the physical interface port before service is activated. This voltage sensing circuit 89a can be formed as a tip/ring high impedance voltage sensing circuit that monitors and measures the DC potential on the physical interface at the ONU as a service unit. This voltage is scaled and read by an analog/digital converter 89b as part of a main processor 100. Details of the port service activation at the physical layer is later described in detail below.

The power management circuit 82 as a subsystem of the ONU includes a soft-start overcurrent protection circuit 90 that is configured to control in-rush current from the reverse power supply at power up. It operates to control in-rush current from the reverse power supply at power up and maintain the reverse power supply from being current limited and shut down. It also protects the port from a power supply fault. An isolated 48 volt to 3.3 volt forward power converter circuit 92 operates as a main supply converter for the power supply circuit board (shown generally by dashed lines) and includes many of the ONU power supply components. It provides galvanic isolation from the tip/ring port interface to various board electronics.

As further illustrated in FIG. 5, POL control voltage switcher circuits 94 are provided and permit a required output supply voltage for the board electronics and run off an isolated 3.3 volt output of the forward converter circuit. Power is supplied to other electronic components 96 as illustrated. A power and temperature microcontroller circuit 98 reads analog voltage and current transducers from the forward converter power supply circuit 90 and ambient temperature of the circuit board in an overall ONU or power circuit enclosure and ensures proper operation and provides a management interface with the total power consumption for the unit. This allows management of services based on power consumption. A main processor 100 manages power alarms and provides in-band communication of the ONU to customer premises devices and network side alarms and EMS. It can communicate in one example through an in-band management channel and trigger an LED 102 to signal visibly any alarms. A dying gasp interrupt circuit 104 provides an interrupt to the main processor when power is failing on units. This allows the processor to send messages to a network alarm center for discriminating device faults from "no service" power faults before power fails on a unit. It also allows the processor to shut down in an orderly fashion the Ethernet switch and physical device, for example, as shown in FIGS. 1 and 2, to minimize bad packet generation errors.

A CPE dying gasp message operates over a communications channel from the CPE alerting the ONU of a CPE being powered down. It can be forwarded to a network alarm system 78 and an EMS 74 to discriminate CPE device faults from customer power removal and generate an appropriate alarm. The main processor also provides power management and has software resident on the processor to actively manage power consumption of the unit by disabling physical devices and switch power consumption on unused and out-of-service ports and non-configured interfaces. This stringent power conservation design allows single CPE port powering of the entire ONU.

Figure 6:
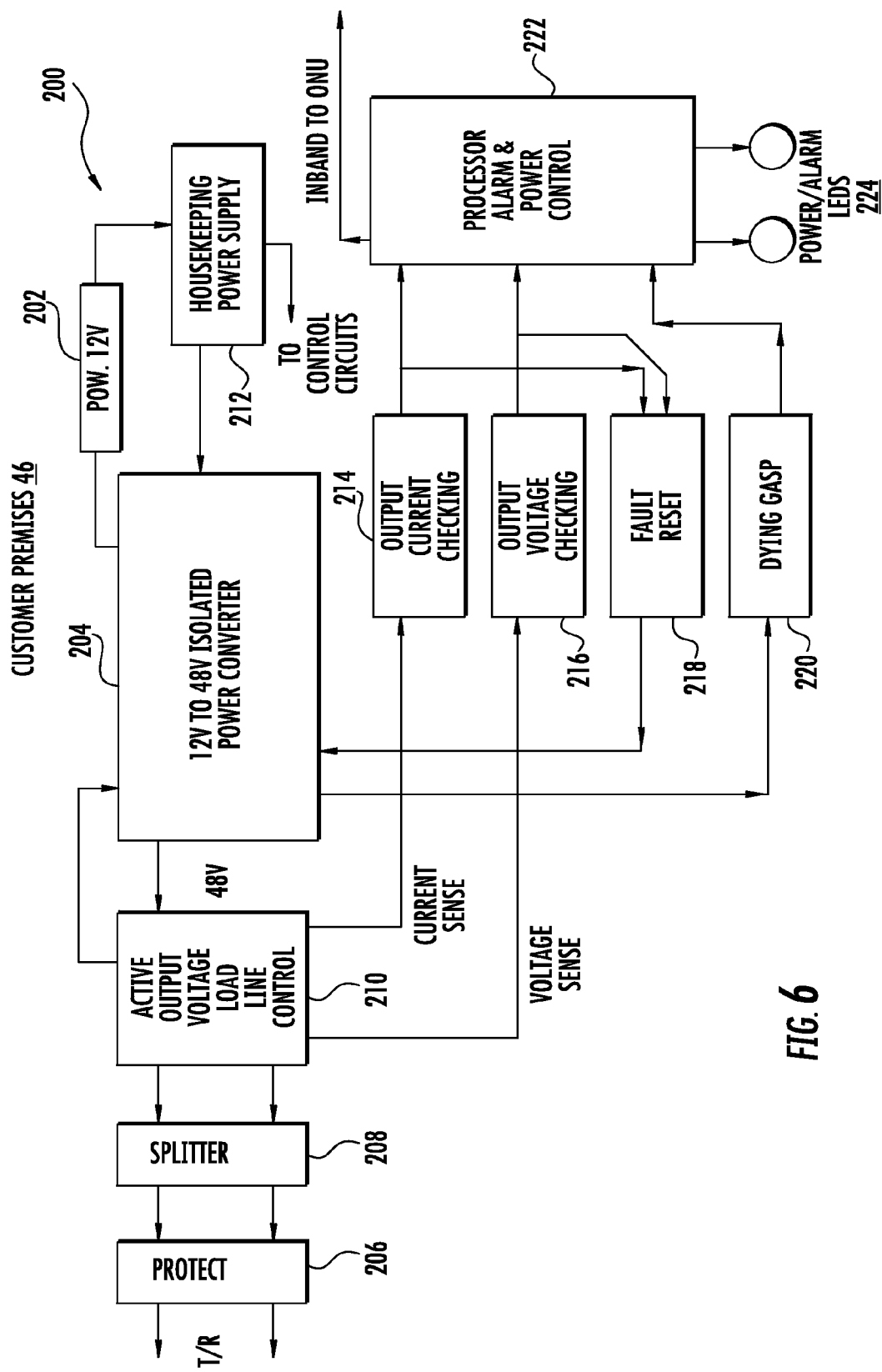
FIG. 6 is a block diagram of a reverse power supply circuit located at a customer premises as part of Customer Premises Equipment (CPE) that can also have alarm fault discrimination for power fault conditions in accordance with a non-limiting example.

FIG. 6 shows a customer premises equipment reverse power supply 200 located at a customer premises. 46 The reverse power supply 200 is powered from an external 12-volt supply 202 located at the customer premises. A 12-volt to 48-volt isolated power converter 204 provides an isolated 48 volts power to reverse power the ONU. Specialized circuits on the CPE provide alarm and fault isolation, transient fault protection, improved current sharing between CPE devices on different length loops and galvanic isolation. The reverse power supply includes circuits to allow robust transient protection to work on the powered line property.

The main processor 100 typically includes power management system software to aid in managing power and alarms. For example, software resident on the processor actively manages power consumption of the ONU by displaying physical device and switch power consumption on unused/out-of-service ports and non-configured interfaces. This stringent power conservation design allows single CPE port powering of an entire ONU used in a fiber to the drop point (FTTDP). Power alarms from the CPE to the FTTDP ONU are communicated via Ethernet OAM messages (ETHOAM) between devices. This is used to communicate dying gasp type and power fault detection alarms from the CPE to the ONU. The ONU communicates the CPE generated alarms and its dying gasp alarm and local Ethernet port power state changes to the EMS such as described relative to FIG. 2 via an SNMP set command or by proxy via an Ethernet OAM command sent to a device such as a Total Access 5000 device as manufactured by ADTRAN, INC. as a non-limiting example or other switch device.

Various components as shown in FIG. 6 are now described.

The protection circuit 206 provides typical secondary protection for lightning and AC power-cross surges on the tip/ring interface. A splitter circuit 208 includes a splitter inductor to isolate the on-board power supply from the high-speed line data interface. The 12-volt to 48-volt converter features active output voltage load line control 210 to improve power sharing between the plurality of CPE. It establishes equitable power sharing between CPE reverse power supplies powering an ONU on different length lines by adjusting the output voltage as a function of load current. As noted before, the 12-volt to 48-volt isolated power converter circuit 204 generates the 48-volt output to power the ONU over a tip/ring (T/R) pair. The housekeeping supply bias circuit 212 is typically a transformer-isolated power supply that generates housekeeping voltages required by the power converter circuit and associated control circuits. The output current checking circuit 214 verifies the output current of the reverse power supply is operating in a proper load current condition. This circuit provides alarm outputs to the processor alarm and power control circuit for undercurrent and open-circuit loop conditions and overcurrent and short-circuit type loop conditions and to the fault reset circuit. The output voltage checking circuit 216 monitors the output voltage to verify it is within normal limits and provides alarm outputs for overvoltage and undervoltage conditions that are transmitted to a processor alarm and power control circuit. The fault reset circuit 218 is connected to the reverse power supply and configured to initiate a power down and power up sequence of a respective reverse power supply when the respective reverse power supply circuit is in a fault condition. This is established for a defined period of time. The reverse power supply is shut down for a defined period and restarted. This allows a transient protection device that triggers on surges on the tip/ring line to release by reducing output current to less than the holding current of the transient protection device. Without this, the transient protection device would remain in a triggered state and data and power would be lost indefinitely.

The dying gasp circuit 220 operates when the power input is removed from the CPE. This circuit provides an early warning of impending power loss to the processor at the ONU to allow the processor time to send a signal indicating CPE power removal as a notification to the ONU over the Ethernet link. This is forwarded to the alarm management 78 and EMS 74 to discriminate power faults from power removal at the CPE device. A processor alarm and power control 222 provides control and signals power and alarm LED's 224.

This reverse power supply as described enhances the current sharing of all the powered communications ports and reduces individual communication port operating costs. The system reduces individual supply maximum power requirements and allows loop fault detection by ensuring loop current on each individual powering pair independent of loop resistance differences. This allows the system to discriminate between an open wire pair, a shorted wire pair, and a good working wire pair to the ONU. The power management circuit on the ONU and reverse power supply circuit at the CPE as a management system controls service delivery and port activation to minimize power consumption of any unit and enable single port powering.

This power management system minimizes power consumption and detects power on an individual port to configure data flow through a switching element such as the Ethernet switch, thereby eliminating excess power consumption in the switch. It permits transmit power to a "chaining" SFP as controlled by a management processor to disable power to the SFP when it is not provisioned. It also allows transmit power to a "chaining" SFP to be disabled and periodically re-enabled for chaining SFP's that do not detect a receive signal. This allows power savings for the local ONU when the far end is not activated or connected. The microcontroller or main processor can be formed as a micropower RISC controller to monitor the ONU power consumption and allow management of the services based on an available number of powering ports and power consumption.

The front-end circuit at each communication port includes a diode "OR" type power front-end circuit to isolate individual port failures, port pair shorts, and allow normal operation when other communication ports are functional. The specialized transient protection is integrated into the power supply of the ONU to prevent transient events from shutting down the local power supply inadvertently when faults occur on individual ports. The reverse power supply design incorporates a "hiccup" power down-power up sequence to allow protection devices to be released and reset after transient port faults. This ONU power supply design maintains nominal output power when individual reverse powered communication ports are shut down and restarted during normal operation or during customer power down of the CPE device which is typically an optical network terminal (ONT) device.

There is a management power and environmental capability that tracks power consumption and environmental conditions via a management VLAN flow. The system allows messaging between a CPE and the ONU and allows communication of alarms and power failure indications on either end. These indications could be transmitted over a variety of protocols such as OMCI, SNMP, CLI, etc. The system communicates to an alarm head end service to allow tracking of power faults and alarms on different ports. An optional network express type power feed port can be provided for battery backed powering from a central office or remote exchange.

The system as described provides a more reliable power alarm and management system with better transient responses. The alarm features allow an early detection when the power is pulled, for example, from a modem at a customer premises. The system provides messages and messaging channels and informs the service provider the reason that a service went down, for example, at a modem or other location. The front-end power circuit as a diode bridge acts as a logical circuit to "or" power together. The reverse power supply as described as part of the CPE has an active output voltage load line control to improve load sharing across the ports and improve circuit functions, such as determining when a modem is shut down. The system improves the sharing and transient response, for example, when an individual shuts one of the ports down. The dying gasp ties into the alarm function and gives the ability for the system to determine that someone has unplugged the device. An interrupt can be created and the processor can send the message reflecting a turn off state.

The alarm messaging system as described is used to communicate changes in a powered state at both the CPE and remote powered ONU.

In accordance with a non-limiting example, an alarm messaging system is used to communicate changes in powered state at both the CPE device and the remote powered ONU. A brief description of the function and components is set forth below. In one example, the local power input feeding the CPE can be monitored by a comparator circuit connected to a local processor and alarm and power control to determine when power is failing on the CPE. Before power is lost on the CPE, a power failure interrupt is provided to the on-board processor 222, e.g., a microcontroller, and a message is transmitted to the ONU alerting the ONU to the power failure occurring on the CPE. As noted before, this is identified as a remote dying gasp. The data and power feed at each redundant input of the remote powered ONU is monitored by the analog-to-digital converter circuit 89b connected to the local microcontroller or processor 100 on the ONU and provides a power status for each input port. This is used in conjunction with the alarm message sent from a CPE to determine if the CPE is powered down or if there has been a fault between devices.

For any provisioned, active port, when a power failure message is received at the ONU, it is forwarded to an alarm service over an uplink to provide information to the system status. This eliminates any confusion as to the source of the port's data service failure. Additional circuitry on the ONU can be used to sense the connectivity of a metallic connection to the CPE and determine if the CPE device is connected to the port and either wire connecting the CPE to the ONU port is open or shorted to each other. By monitoring the voltage feed input on each port, the system also determines if the power feed input is working, but at a level that is indicative of a soft fault or pair degradation. Circuits on the CPE determine if the power feed is feeding current in a normal mode, providing proper voltage but no current (pair open), or feeding too much current (over current/under voltage) which could be a pair fault. If a communication channel is available to the ONU, changes in state of these power states are communicated to the ONU via messages and then forwarded on to the alarm service from the ONU. The specific alarm messages may be sent over multiple management protocols, such as OMCI, SNMP, CLI, etc. SNMP is preferred in one non-limiting example.

In the event that a failure of the CPE reverse powering supply occurs and there is still connectivity of the data channel between the ONU port and CPE data port, alarm information from an alarm service defines the detected fault may be transmitted to the ONU, without disrupting service to the end customer. A comparator circuit on the ONU local supply can be used to determine when power is failing on the ONU. This circuit is connected to an interrupt on the local control processor 100 and triggers an alarm message to the alarm service and attached CPE devices, alerting them to the change of operating state.

Figure 7:
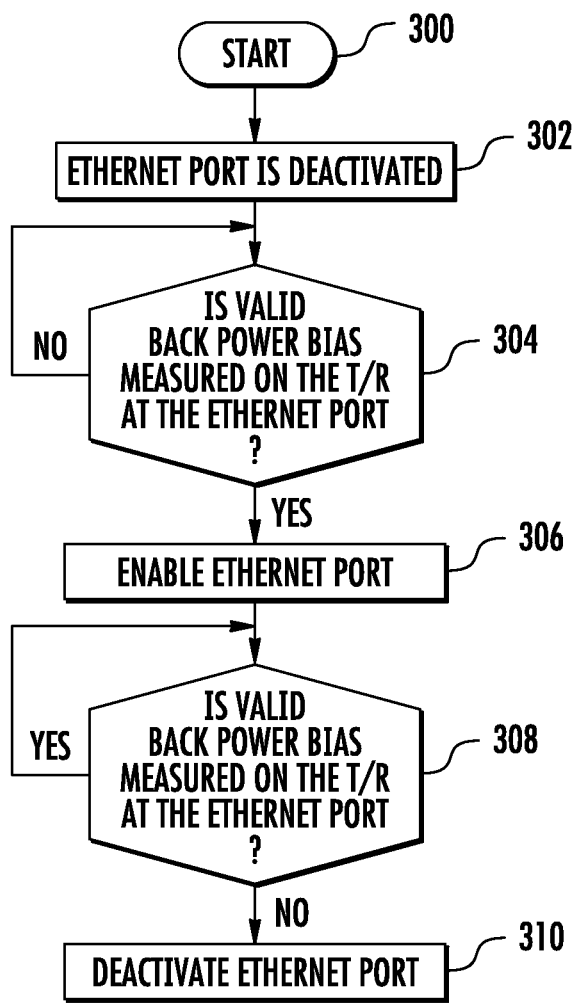
FIG. 7 is a flowchart illustrating the power check performed on a physical interface port as an Ethernet port before communications data service is activated in accordance with a non-limiting example.

FIG. 7 is a flowchart illustrating the Ethernet port activation flow diagram that is used to ensure reliable, redundant reverse power to the ONU. A power check is first performed on the physical interface port before any service activation of the Ethernet service port. This is used in conjunction with the tip/ring high impedance voltage sensing circuit 89a that monitors and measures the DC potential on the physical interface at the ONU. As illustrated in FIG. 7, the process starts (block 300) and at that time, the Ethernet port is deactivated (block 302). A determination is made if valid reverse power bias is measured on the tip/ring circuits of the corresponding to the Ethernet port (block 304). If not, then the process repeats, and if yes, the Ethernet port physical device is enabled to communicate with the CPE. The Ethernet port reverse power alarms are cleared (block 306).

Another determination is made if the valid reverse power bias is measured on the tip/ring circuits of the Ethernet port (block 308). If yes, the process is repeated, and if not, the Ethernet port as the physical device is deactivated and the Ethernet port reverse power bias alarm is declared (block 310).

In this description, the term SU (service unit) is also used and is an interchangeable term with ONU for purposes of consistency and understanding. By forcing valid reverse power bias voltage before providing service, the ONU enforces that valid powering is available on the ONU and ensures a compatible and functional CPE unit exists at the customer. It also minimizes power use when the Ethernet port power is unavailable and guarantees power is available from the line to ONU circuits associated with the line to improve robustness of redundant powering operation.

Three power alarm domains are defined: 1) CPE Power Supply Alarms; 2) CPE/ONU Line Fault Alarms; and 3) ONU Power Alarms.

Three distinct alarm domains are defined for isolating ONU port service faults to the appropriate fault location with respect to powering the ONU. These alarm domains allow for discrimination of Ethernet (TRE) link faults that are caused by: external CPE power supply faults; facility line faults between CPE and ONU (SU) on T/R pair; and ONU port input power detection faults.

In a reverse powered ONU, the CPE devices provide power on the line to power the 8 port ONU. The ONU can be powered by up to 8 unique devices which provide a robust redundant powering system for the device. The CPE derives its power from an external AC to 12V battery backed power supply. This external power supply has two alarm outputs that are connected to and read by the CPE.

The External CPE Power Supply Alarm outputs are:

1) AC Failure: This alarm becomes active when AC power input to the External CPE power supply is missing or low. It causes the CPE to send an alarm message to the ONU and acknowledged back to the CPE.

2) Low Battery Voltage: This alarm becomes active when the rechargeable battery bank inside of the External CPE supply reaches a low voltage limit. This will occur after the battery bank is almost fully discharged during an AC power fault condition, when the battery bank is powering the ONU load instead of the AC feed. When this threshold is reached, an alarm message is sent to the ONU device and acknowledged back to the CPE device. Once this alarm is transmitted and acknowledged back to the CPE, the CPE power output to the ONU is disabled until the CPE power supply recovers AC power. This allows for a controlled shutdown of the port and power usage both at the CPE and ONU, and will enable a clean return to powered, data service activation when CPE power is restored.

Facility Line Faults: Circuitry on the CPE can determine if a power fault exists on the physical pair. The following fault conditions can be detected:

1) Physical Pair shorted/Over-current: This is determined by measuring the voltage and current between Tip and Ring. This is used to detect a shorted pair fault.

2) Physical Pair Open/undercurrent: This is determined by measuring the voltage and current on the T/R pair as measured Tip to Ring. This is indicative of one or both wires in the pair not having physical connection to the SU port power termination.

3) Physical Pair leakage current to GND: By measuring the current imbalance on T/R wires, leakage to ground faults can be detected on the physical pair.

SU (ONU) Power Input Detected Faults: The ONU monitors the input voltage at each input port to determine if a valid powering voltage is available at the input port. The ONU will not enable the Ethernet PHY interface power or the PHY data output signal until a valid power input voltage is detected. This ensures that the ONU does not use power for a port unless the port is providing reverse power to the ONU to support it. With this interlock between the power input detected and the ONU PHY port power output enabled, the robustness of the redundant power feeds is improved and fair port service delivery is ensured based on reverse powering from each CPE.

SU Port Power Alarm: This alarm occurs when the ONU detects low/no powering voltage available on a given port input. When this alarm is active, no PHY power is provided out the port to enable the physical data link layer on the port. This provides protection for the ONU powering system to ensure that only ports that provide reverse powering will use power from the system supply to provide service. This alarm is forwarded to the upstream alarm system as well.

When the ONU receives a Low Battery Alarm message from a CPE device on a given port, the alarm is acknowledged back to the CPE device and the CPE will shutdown the reverse powering supply output to the ONU device. This output will be restored when the AC power input is restored. This mitigates intermittent brownout faults on the lines and ensures clean transitions from in-service to out-of-service conditions based on powering faults. In this way, the operator for the equipment can determine and isolate physical device layer faults from power failure faults at the CPE premise.

Figure 8:
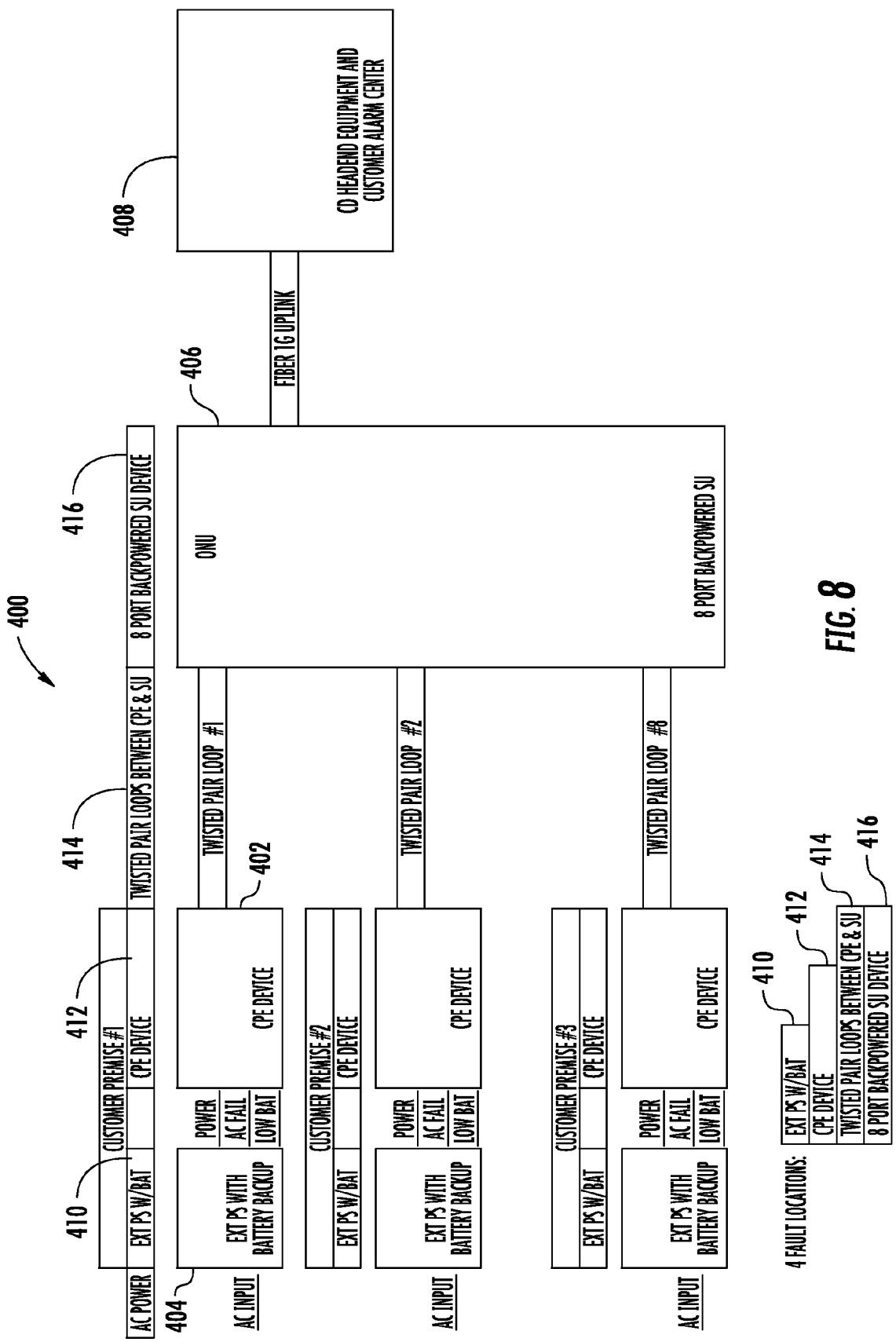
FIG. 8 is a block diagram showing the ONU, a plurality of connected CPE's, and a central office headend equipment and customer alarm center and showing alarm fault discrimination and fault location detection in accordance with a non-limiting example.

Dying Gasp: The ONU has a dying gasp early power failure detect circuit 220 that is triggered when the internal power rail derived from the CPE reverse power inputs reaches a low voltage threshold. At this threshold, the dying gasp generates an NMI (non-maskable interrupt) into the processor 222. This results in a DYING GASP alarm to be sent down the uplink to an alarm system in the CO such as shown in FIG. 8 and described below. The time between the low voltage threshold detect and the device loosing adequate power to operate is designed to be adequate to send the dying gasp message multiple times until it is acknowledged back to the ONU at which point the processor shuts down.

FIG. 8 illustrates the alarm fault discrimination and fault location detection in a reverse powered redundant communication system using a reverse powered ONU. The overall system is illustrated at 400. Each CPE 402 includes an external power supply with battery back-up 404. The CPE connects to the ONU 406 as an eight-port reverse powered service unit. A one gigabit fiber uplink extends from the ONU 406 to the central office headend equipment and customer alarm center 408 as illustrated. Various fault locations are illustrated with the external power supply with battery 410, the CPE 412, the twisted pair loops between the CPE and service unit as the ONU 414, and the eight port reverse powered device 416.

Further information regarding what alarms are detected and their source descriptions are set forth below. The term service unit (SU) is used also in place of ONU in some instances.

| | |
|---|---|
| Alarms Detected: | EXT PS AC FAIL |
| Location of Alarm Detection: | CPE |
| Fault Location Determined: | AC Power |
| Alarm Provided to Customer: | EXT PS AC FAIL |
| Notes: | This alarm is generated when AC is removed from EXT PS connected to CPE. |
| | Not service affecting until EXT PS battery backup low battery alarm becomes active |
| Alarms Detected: | EXT PS LOW BATTERY and EXT PS AC FAIL |
| Location of Alarm Detection: | CPE |
| Fault Location Determined: | AC Power |
| Alarm Provided to Customer: | EXT PS LOW BATTERY/EXT PS AC FAIL |
| Notes: | These alarms are generated when AC is removed from EXT PS connected to CPE and the battery backup voltage becomes too low to provide service |
| | After alarm is sent and acknowledge to Customer Alarm Center, CPE service put in an out of service state until EXT PS LOW BATTERY alarm is cleared |

| | |
|---|---|
| Alarms Detected: | EXT PS LOW BATTERY and EXT PS AC FAIL and CPE Low Input Volts |
| Location of Alarm Detection: | CPE |
| Fault Location Determined: | AC Power/CPE Power |
| Alarm Provided to Customer: | CPE External Power Failed |
| Notes: | The CPE Low Input Volts alarm is generated when the EXT PS output battery voltage is below the CPE low voltage input threshold Continued service at the CPE is not possible due to low input voltage. Alarm is sent and acknowledged to Customer Alarm Center, identifying external power fault as reason for service alarm. CPE device is service disabled and shut down until this alarm condition clears. |
| Alarms Detected: | CPE Line Power Supply Low Volts |
| Location of Alarm Detection: | CPE |
| Fault Location Determined: | CPE Line Power Supply Fault |
| Alarm Provided to Customer: | CPE Line Power Failure |
| Notes: | This fault indicates that the CPE Line Power Module is damaged and the CPE must be replaced Since the SU is redundant power feed, this alarm can be communicated if fault doesn't affect data link |
| Alarms Detected: | CPE Line Power Supply Low Volts and CPE Line Power Over Amps and SU Port Low Volts |
| Location of Alarm Detection: | CPE and SU |
| Fault Location Determined: | Twisted Pair Loop short |
| Alarm Provided to Customer: | Twisted Pair Loop Short - Portx |
| Notes: | This alarm is indicative with a fault in the twisted pair between SU and CPE device Since the SU is redundant power feed, this alarm can be communicated if fault doesn't affect data link |
| Alarms Detected: | CPE T/R Leakage to GND |
| Location of Alarm Detection: | CPE |
| Fault Location Determined: | Twisted Pair Loop Leakage to GND |
| Alarm Provided to Customer: | Twisted Pair Loop Leakage to GND - Portx |
| Notes: | This alarm is indicative with a fault in the twisted pair between SU and CPE device Since the SU is redundant power feed, this alarm can be communicated if fault doesn't affect data link |
| Alarms Detected: | CPE Under Amps |
| Location of Alarm Detection: | CPE |
| Fault Location Determined: | 8 Port SU Power Input Fault |
| Alarm Provided to Customer: | SU Power Input Fault - Portx |
| Notes: | This alarm is indicative of a fault on the power input feed for Portx on the SU Since the SU is redundant power feed, this alarm can be communicated if fault doesn't affect data link |
| Alarms Detected: | CPE Under Amps and SU Low Voltage |
| Location of Alarm Detection: | CPE and SU |
| Fault Location Determined: | Twisted Pair Open Circuit between CPE and SU |
| Alarm Provided to Customer: | Twisted Pair Loop Open - Portx |
| Notes: | This alarm is indicative of an open connection in the twisted pair between SU and CPE device Since the SU is redundant power feed, this alarm can be communicated if fault doesn't affect data link |

| ALARM | DESCRIPTION |
|---|---|
| EXT PS AC FAIL | This is a relay contact controlled by the External Power Supply with Battery Backup that is monitored by the CPE device It is activated when AC power is removed from the input of the unit |
| EXT PS LOW BATTERY | This is a relay contact controlled by the External Power Supply with Battery Backup that is monitored by the CPE device It is activated when internal EXT power Battery reaches a programmable low voltage setpoint |
| CPE Low Input Volts | This is an alarm generated internal to the CPE that triggers when the input power voltage drop below a low voltage threshold |
| CPE Line Power Supply Low Volts | This is an alarm generated internal to the CPE that triggers when the reverse power supply output is below a low voltage threshold |
| CPE Line Power Over Amps | This is an alarm generated internal to the CPE that triggers when the reverse power supply output is pulling above a maximum threshold current from the loop |
| CPE Line Power Under Amps | This is an alarm generated internal to the CPE that triggers when the reverse power supply output is not providing a minimal threshold amount of current to the loop |
| CPE T/R Leakage to GND | This is an internally generated alarm that is triggered when the reverse power supply is driving current into and out of GND. |
| SU Low Voltage | This is an alarm on the SU that is triggered when the reverse power feed on a twisted pair loop port is below a minimum voltage threshold. |

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. An optical communications system, comprising:
   a plurality of customer premises equipment (CPE) each having a reverse power supply and each connected to a twisted wire pair; each CPE configured to transmit and receive data and provide power over the twisted wire pair; and
   an optical network unit (ONU) comprising:
      a switch including a plurality of communication ports that are each connected to a corresponding twisted wire pair and configured to provide downstream communications data service from a central office to a corresponding CPE over the corresponding twisted wire pair; and
      a power management circuit connected to the communication ports, the power management circuit including: and
         a reverse power detector that is configured to detect a reverse power status of operating power provided by each reverse power supply at each communication port, wherein:
      the switch is configured to activate and de-activate the downstream communications on each communication port based on the reverse power status of that communication port, wherein the power management circuit is configured to activate the downstream communications on a communication port having a valid reverse power status and de-activate the downstream communications on a communication port having an invalid reverse power status.

2. The optical communications system according to claim 1, wherein the power management circuit is configured to provide a power status signal to a processor at the ONU indicating whether power exists at each communication port, said processor operative to receive an alarm signal from a CPE and determine if the CPE is powered down or if there has been a power line fault between a CPE and the ONU.

3. The optical communications system according to claim 1, wherein the ONU includes a processor that is configured to receive a dying gasp interrupt from a CPE indicative that power is failing on a reverse power supply at a CPE.

4. The optical communications system according to claim 3, wherein each CPE includes a circuit configured to determine when power is failing on the CPE and a processor configured to receive and process data regarding when power is failing to generate the dying gasp interrupt that is transmitted to the ONU.

5. The optical communications system according to claim 3, and further comprising a power manager circuit configured to receive a signal indicative that the processor at the ONU received a dying gasp interrupt and discriminate CPE power fault conditions from a removal of power initiated by a customer.

6. The optical communications system according to claim 1, wherein the ONU includes a processor that is configured to distinguish among a) external CPE power supply faults; b) CPE; and c) ONU facility line faults; and ONU power input detection faults.

7. The optical communications system according to claim 6, wherein said external CPE power supply faults comprise an AC power input failure at the CPE or low battery voltage.

8. The optical communications system according to claim 6, wherein said facility line faults comprise a) a physical pair shorted and over-current; b) a physical pair open and under-current; and c) a physical pair leakage to ground.

9. The optical communications system according to claim 6, wherein said ONU power input detection faults comprises an alarm that indicates a valid powering voltage is available at an input port.

10. An optical network unit (ONU), comprising:
    a plurality of communication ports that are each configured to connect to a corresponding twisted wire pair and to provide downstream communications data service to a corresponding customer premises equipment (CPE) over the twisted wire pair; and
    a power management circuit connected to each of the communication ports, the power management circuit including:
       a reverse power detector that is configured to detect a reverse power status of power provided by each reverse power supply at each communication port; and
       a communications switch coupled to the reverse power detector, wherein the communications switch is configured to activate the downstream communications on a communication port having a valid reverse power status and de-activate downstream communications on a communication port having an invalid reverse power status.

11. The optical network unit according to claim 10, wherein the power management circuit is configured to provide a power status signal to a processor at the ONU indicating whether power exists at each communication port, said processor operative to receive an alarm signal from a CPE and determine if the CPE is powered down or if there has been a power line fault between a CPE and an tip/ring interface.

12. The optical network unit according to claim 10, wherein said ONU includes a processor that is configured to receive a dying gasp interrupt from a CPE indicative that power is failing on the CPE.

13. The optical network unit according to claim 12, wherein said power manager circuit is configured to receive a signal indicative that the processor received a dying gasp interrupt and discriminate CPE power fault conditions from a removal of power initiated by a customer.

14. The optical network unit according to claim 10, wherein said ONU includes a processor that configured to distinguish among a) external CPE power supply faults; b) CPE and ONU facility line faults; and c) ONU power input detection faults.

15. The optical network unit according to claim 14, wherein said external CPE power supply faults comprise an AC power input failure at the CPE or low battery voltage.

16. The optical network unit according to claim 14, wherein said facility line faults comprise a) a physical pair shorted and over-current; b) a physical pair open and under-current; and c) a physical pair leakage current to ground.

17. The optical network unit according to claim 14, wherein said ONU power input detection faults comprises an alarm that indicates whether a valid powering voltage is available at an input port.

* * * * *

UNITED STATES PATENT AND TRADEMARK OFFICE
CERTIFICATE OF CORRECTION

PATENT NO.         : 8,818,192 B1
APPLICATION NO.    : 13/163804
DATED              : August 26, 2014
INVENTOR(S)        : Brian C. Smith and Steven M. Robinson It is certified that error appears in the above-identified patent and that said Letters Patent is hereby corrected as shown below:

In the Claims

In Column 15, In Line 11 (approx.), In Claim 9, delete "indicates" and insert -- indicates whether --, therefor.

In Column 16, In Line 51 (approx.), In Claim 14, delete "that" and insert -- that is --, therefor.

Signed and Sealed this
Eighteenth Day of August, 2015

Michelle K. Lee
*Director of the United States Patent and Trademark Office*